United States Patent
Zimmerman

(10) Patent No.: US 9,137,938 B2
(45) Date of Patent: Sep. 22, 2015

(54) AGRICULTURAL IMPLEMENT WITH SELF-CENTERING PIVOTS

(71) Applicant: Raymond Zimmerman, Cantril, IA (US)

(72) Inventor: Raymond Zimmerman, Cantril, IA (US)

( * ) Notice: Subject to any disclaimer, the term of this patent is extended or adjusted under 35 U.S.C. 154(b) by 123 days.

(21) Appl. No.: 13/959,828

(22) Filed: Aug. 6, 2013

(65) Prior Publication Data

US 2015/0041160 A1   Feb. 12, 2015

(51) Int. Cl.
*A01B 61/00* (2006.01)
*A01B 61/04* (2006.01)
*A01C 23/00* (2006.01)

(52) U.S. Cl.
CPC ............... *A01B 61/04* (2013.01); *A01C 23/00* (2013.01)

(58) Field of Classification Search
CPC ........ A01B 35/24; A01B 39/22; A01B 39/00; A01B 61/04; A01B 61/046; A01B 61/00; A01B 61/02; A01C 5/00; A01C 5/064; A01C 5/06; A01C 5/062; A01C 7/081; A01C 7/206; A01C 23/025; A01C 23/00
USPC ............... 111/121, 155, 156, 197; 172/624.5, 172/705–711, 776
See application file for complete search history.

(56) References Cited

U.S. PATENT DOCUMENTS

| | | | | |
|---|---|---|---|---|
| 2,828,678 | A | * | 4/1958 | Sokolik ........................ 172/500 |
| 2,906,353 | A | | 9/1959 | Rogers |
| 3,108,643 | A | | 10/1963 | Williams |
| 3,319,589 | A | | 5/1967 | Moran |
| 3,469,637 | A | | 9/1969 | Kennedy |
| 3,490,544 | A | * | 1/1970 | Godbersen ................... 172/705 |
| 3,949,814 | A | | 4/1976 | Ralston |
| 4,205,615 | A | | 6/1980 | Jacobson |
| 4,452,317 | A | | 6/1984 | Moos |
| 4,493,273 | A | * | 1/1985 | Gauchet et al. .............. 111/154 |
| 4,521,988 | A | | 6/1985 | Thacker |
| 4,548,277 | A | | 10/1985 | Dietrich, Sr. et al. |
| 4,660,652 | A | | 4/1987 | Moos et al. |
| 4,694,759 | A | * | 9/1987 | Dreyer et al. ................ 111/151 |
| 4,745,978 | A | | 5/1988 | Williamson |
| 4,759,301 | A | * | 7/1988 | Thomas ....................... 111/156 |
| 5,154,239 | A | | 10/1992 | Harrell et al. |
| 5,267,618 | A | | 12/1993 | Harrell |
| 5,427,183 | A | | 6/1995 | Parker |
| 8,327,780 | B2 | | 12/2012 | Bassett |

* cited by examiner

*Primary Examiner* — Robert Pezzuto
(74) *Attorney, Agent, or Firm* — McKee, Voorhees & Sease, PLC

(57) ABSTRACT

A self-centering pivot assembly for an agricultural implement having a tool bar is provided. The self-centering pivot assembly includes at least one spring, a bar segment operatively connected to one or more working tools of the agricultural implement, and a mounting assembly operatively connected between the tool bar and the bar segment. The self-centering pivot assembly further includes a pivot operatively connected to the bar segment and the at least one spring such that as the agricultural implements travels over the ground and the bar segment deviates laterally from a neutral position, the at least one spring temporarily compresses and urges the bar segment back towards the neutral position.

20 Claims, 7 Drawing Sheets

AGRICULTURAL IMPLEMENT WITH SELF-CENTERING PIVOTS

FIELD OF THE INVENTION

The present invention relates to agricultural implements. More particularly, the present invention relates to a toolbar which provides self-centering pivots.

BACKGROUND OF THE INVENTION

As the number of rows on farm equipment continues to increase, one of the problems that is introduced is the ability for an agricultural implement to properly steer all of its rows. This may be especially problematic where contour farming practices are followed, where the ground is uneven, or in other such situations. Problems are increased as the number of rows of the implement increase. Thus, problems remain.

SUMMARY OF THE INVENTION

Therefore, it is a primary object, feature, or advantage of the present invention to improve over the state of the art.

It is a further object, feature, or advantage of the present invention that allows for self-steering of tool bar sections of a toolbar.

It is a still further object, feature, or advantage of the present invention to provide for proper tracking of rows no matter how may rows wide the toolbar is and regardless of irregularities in the ground.

One or more of these and/or other objects, features, or advantages of the present invention will become apparent from the specification and claims that follow. No single embodiment need meet each and every one of these objects, features, or advantages.

According to one aspect, a self-centering pivot assembly for an agricultural implement having a tool bar is provided. The self-centering pivot assembly includes at least one spring, a bar segment operatively connected to one or more working tools of the agricultural implement, and a mounting assembly operatively connected between the tool bar and the bar segment. The self-centering pivot assembly further includes a pivot operatively connected to the bar segment and the at least one spring such that as the agricultural implements travels over the ground and the bar segment deviates laterally from a neutral position, the at least one spring temporarily compresses and urges the bar segment back towards the neutral position.

According to another aspect, a self-centering pivot assembly for an agricultural implement is provided. The self-centering pivot assembly includes a bar segment operatively connected to one or more working tools of the agricultural implement, a mounting assembly operatively connected to the bar segment, the mounting assembly comprising a first mounting plate above the bar segment and a second mounting plate below the bar segment, a first spring operatively connected to the mounting plate, and a second spring operatively connected to the mounting plate. The first spring and the second spring extend rearwardly from the mounting assembly and beyond the bar segment. The bar segment pivotally rotates relative to the mounting plate at a pivot such that as the bar segment deviates laterally from a neutral position, the first spring and the second spring temporarily compress and urge the bar segment back towards the neutral position.

DETAILED DESCRIPTION OF THE PREFERRED EMBODIMENT

Figure 1:
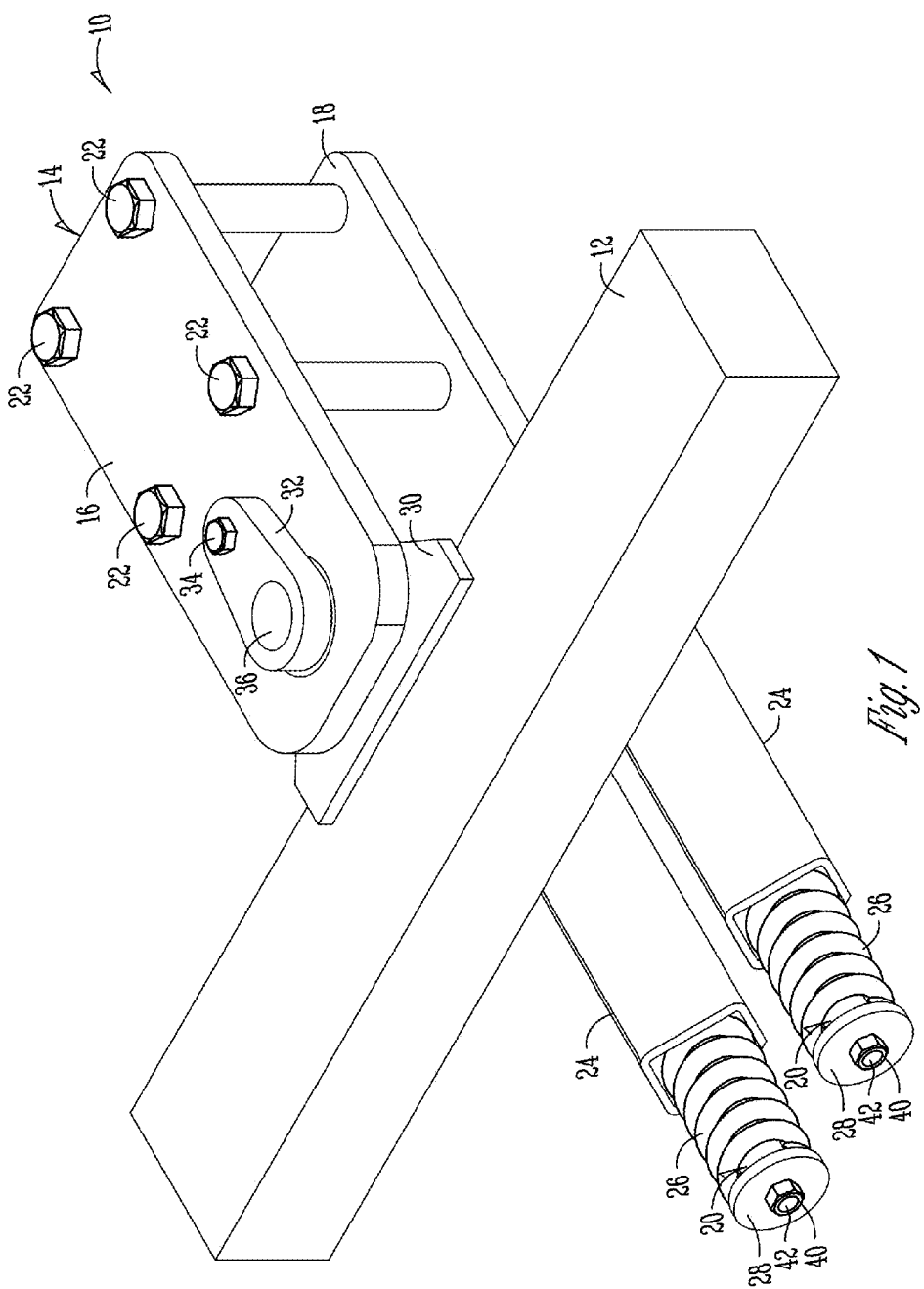
FIG. 1 is a perspective view of one embodiment of a self-centering pivot assembly.

FIG. 1 is a perspective view illustrating a self-centering pivot assembly 10. The assembly 10 includes a bar segment 12. A mounting assembly 14 is shown with a first mounting plate 16 and an opposite second mounting plate 18. Bolts 22 extend through holes in the mounting plates in order to connect the mounting plates 16, 18 to a toolbar (not shown). In addition a bracket 30 connects the bar segment 12 with the mounting assembly 14. Coil guides 24 extend from an opposite side of the bar segment for housing the springs 26. An end plate 28 and a spring receiver 20 are shown on each spring 26. A bolt 42 extends through each spring 26 with a nut 40 on the bolt 42 for maintaining the bolt 42 in place. The combination of the end plate 28 and the spring receiver 20 with the bolt 42 and nut 40 allow for the tensioning of each spring to be set.

A center pivot 36 is shown with a stabilization bracket 32. The stabilization bracket 32 may be welded in place around the center pivot 32 and attached to the mounting assembly 14 with a bolt 34, but the stabilization bracket 32 does not rotate with the center pivot 36, but instead the stabilization bracket 32 is fixed in place to provide stabilization.

In operation, the bar 12 and springs 26 rotate with the pivot 36 and relative to the mounting assembly 14. The center pivot 36 has a neutral position but as the bar segment 12 is rotated laterally to a different position, then the springs 26 bias the bar segment 12 back to the neutral position.

Figure 2:
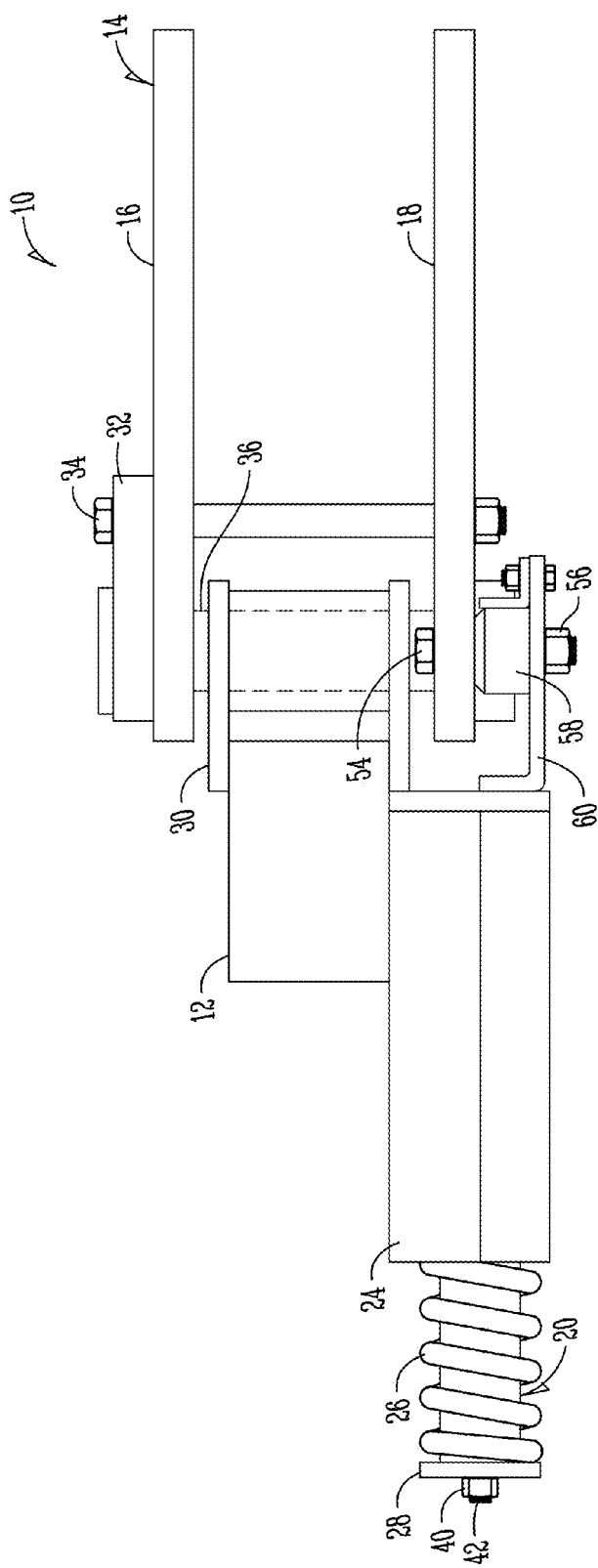
FIG. 2 is a side view of the self-centering pivot assembly.
Figure 3:
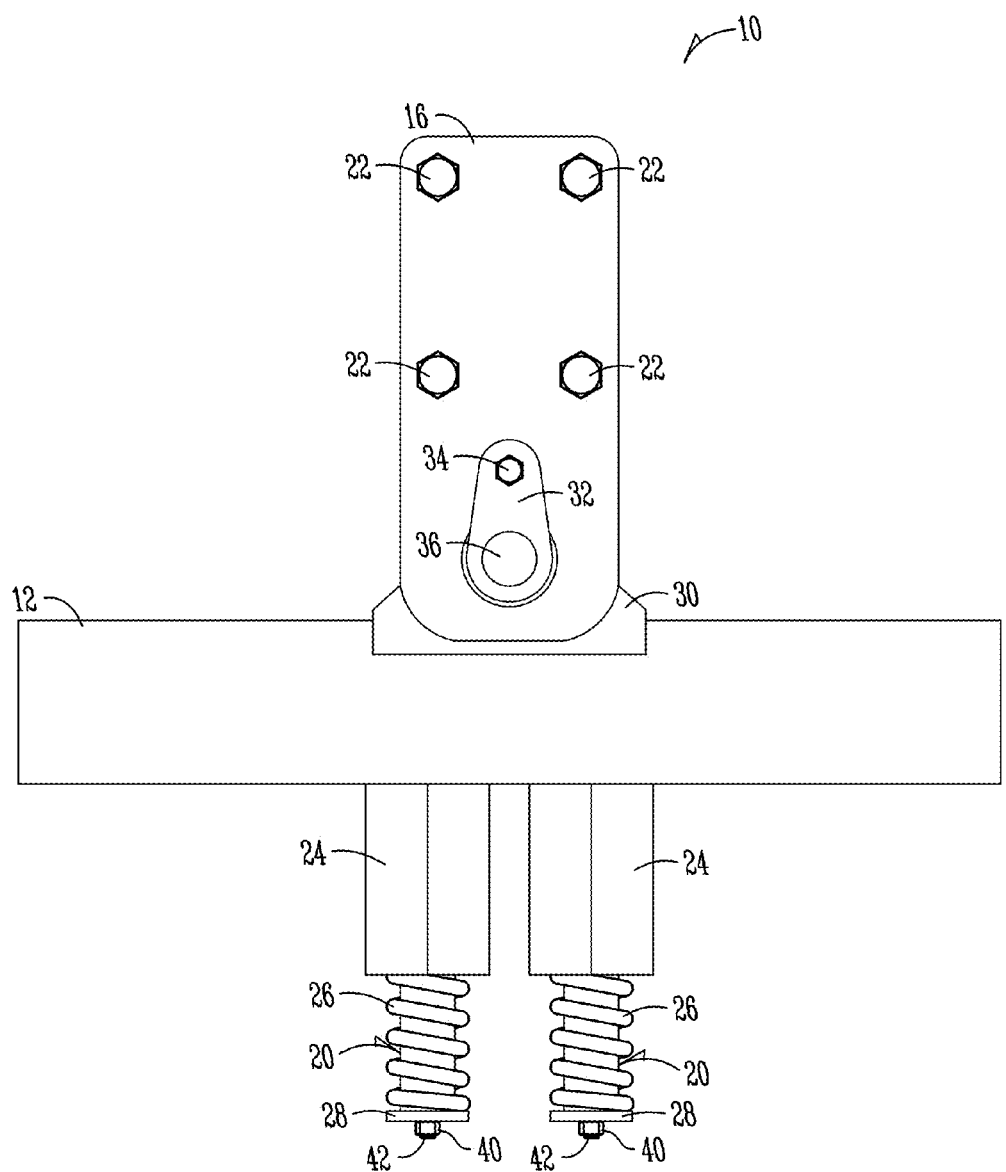
FIG. 3 is a top view of the self-centering pivot assembly.

FIG. 2 is a side view of the self-centering pivot assembly 10. As shown in FIG. 2, a nylon roller 58 may be used. A bolt 54 is shown which extends through a slot in a bracket 60. FIG. 3 is a top view of the self-centering pivot assembly 10. The brackets 60 may be adjusted to align the self-centering pivot assembly 10 with additional self-centering pivot assemblies on a toolbar.

Figure 4:
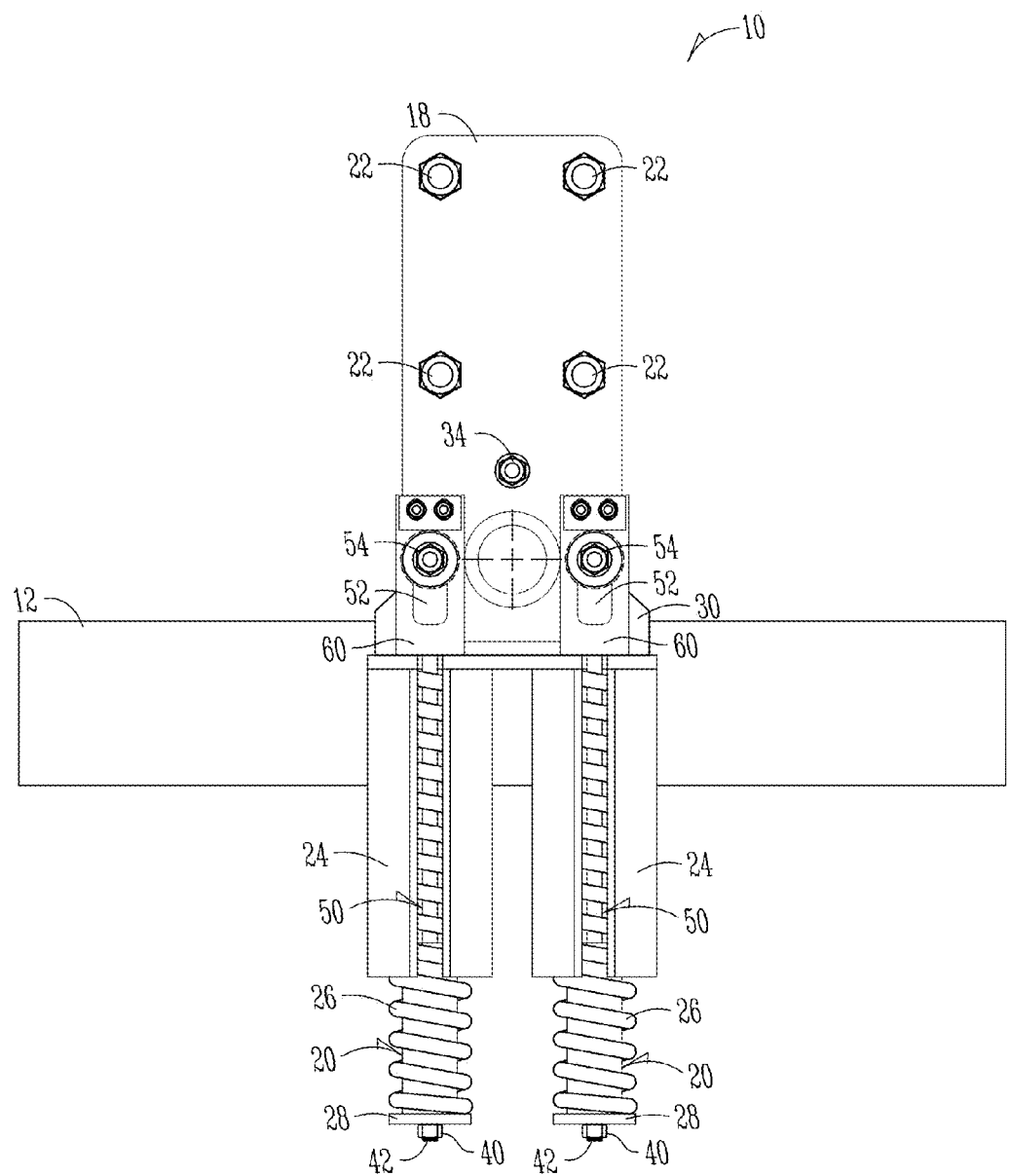
FIG. 4 is a bottom view of the self-centering pivot assembly.
Figure 5A:
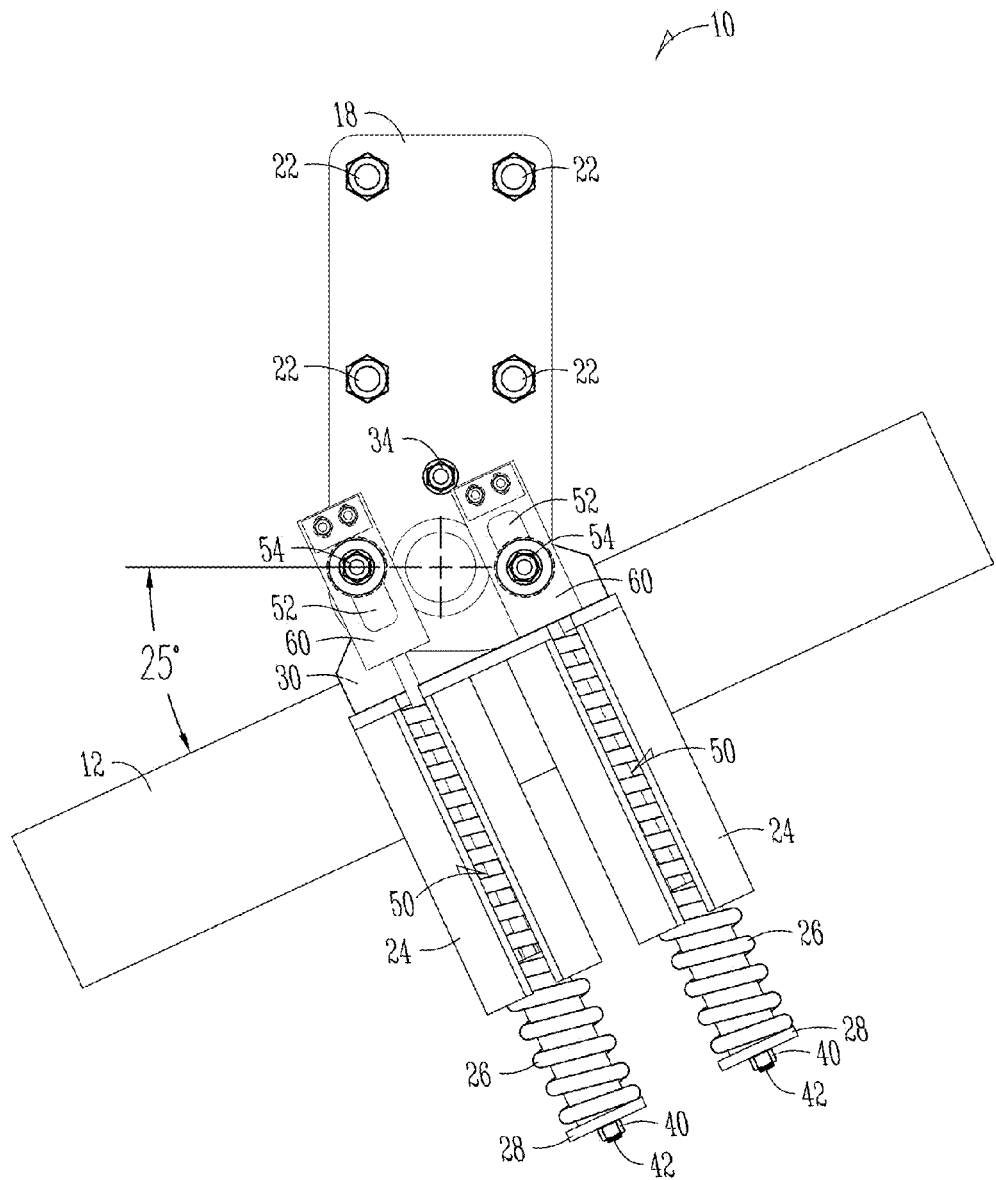
FIG. 5A illustrates pivoting in one direction.
Figure 5B:
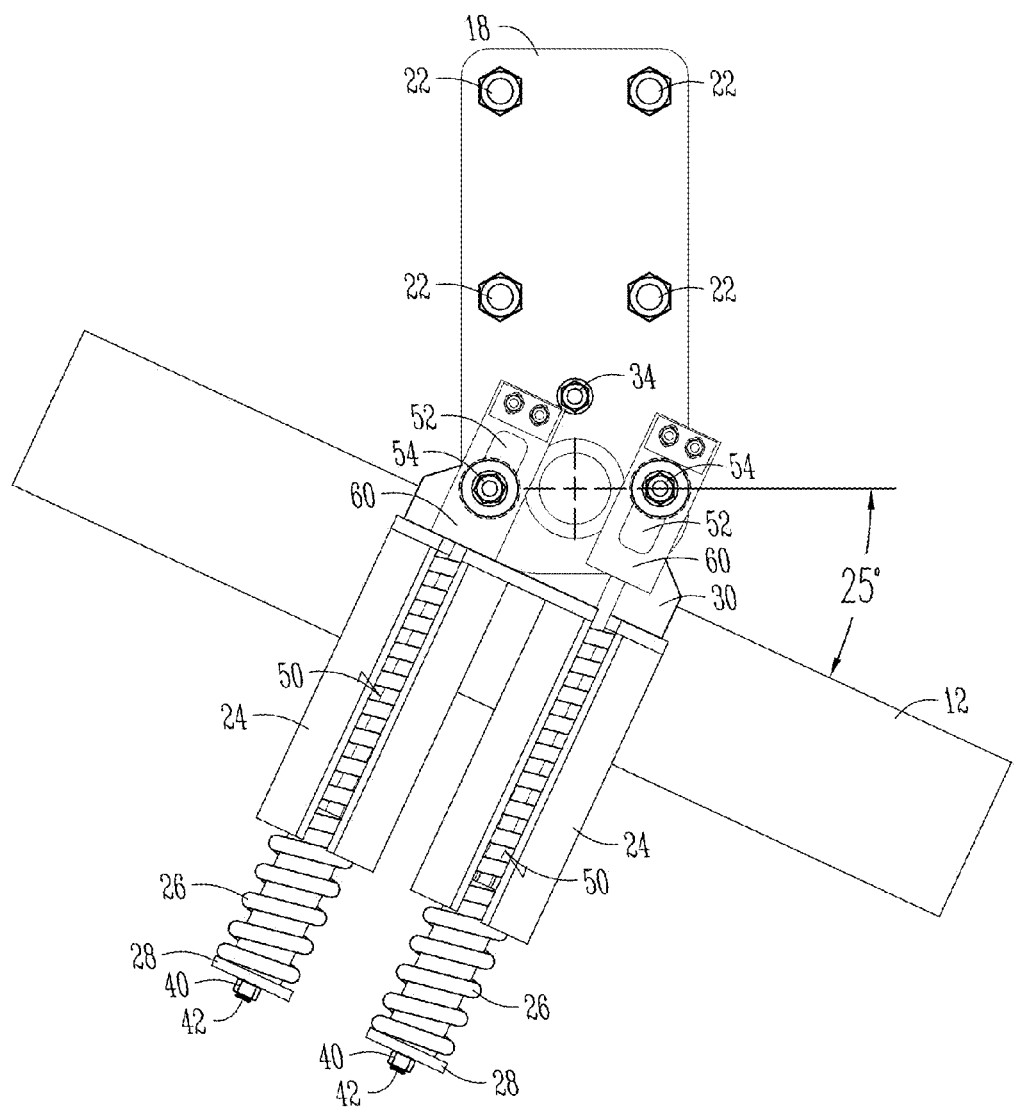
FIG. 5B illustrates pivoting in another direction.

FIG. 4 is a bottom view of the self-centering pivot assembly 10. Note that the coil guides 24 have openings 50 in them to provide access such as for cleaning the springs. On opposite sides of the pivot 36 are slots 52 with a bolt 54 extending through each of the slots 52, each bolt 54 secured with a nut 56. As shown in FIG. 5A, as the bar 12 rotates at the pivot, the position of each bolt 54 in the corresponding slot 52 changes. FIG. 5B illustrates rotation in an opposite direction. The present invention contemplates that the range of motion permitted may vary. In one embodiment, the bar 12 may pivot up to 25 degrees in either direction, however, more or less rotation may be permitted as may be desirable for a particular application or type of agricultural implement.

Figure 6:
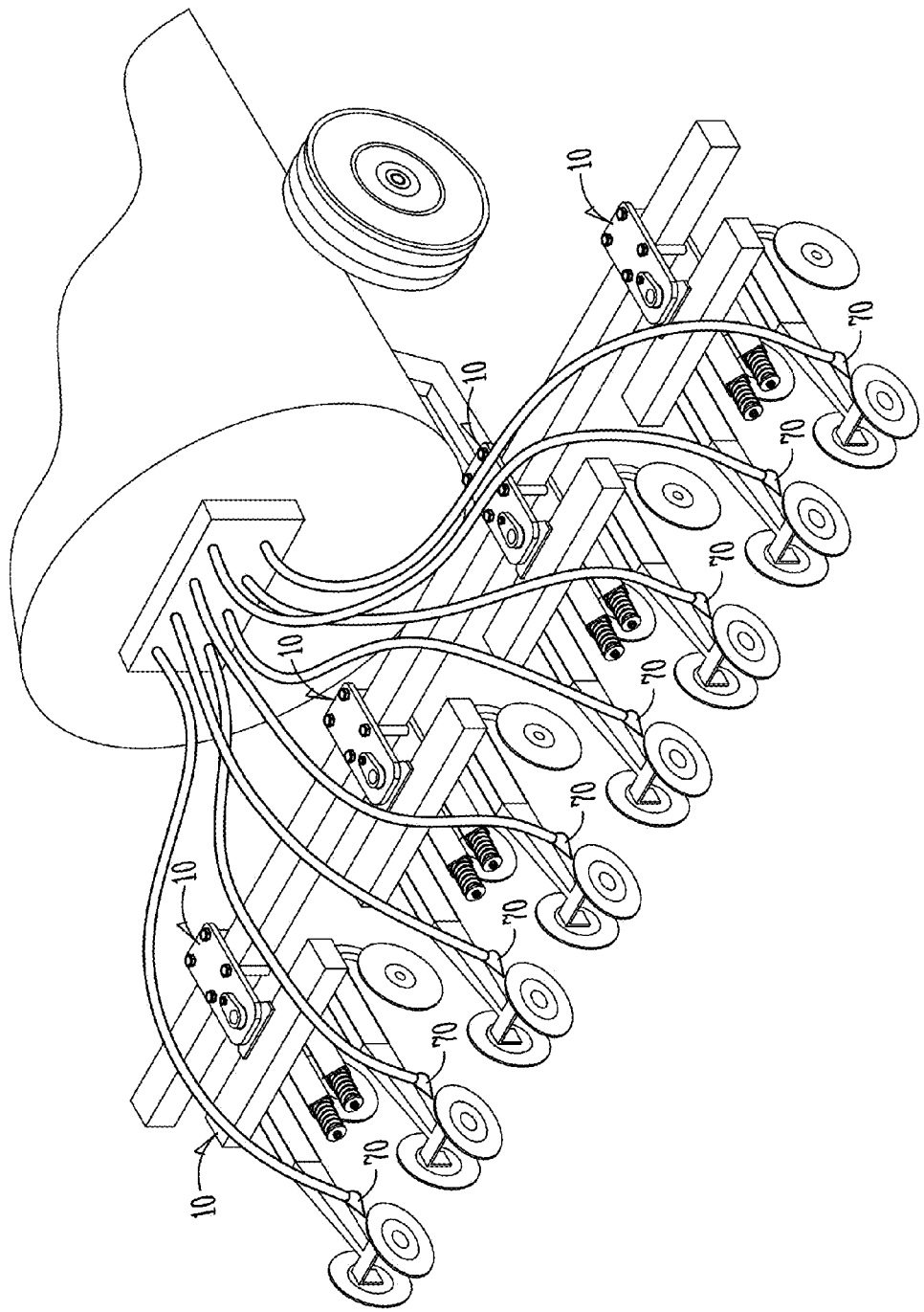
FIG. 6 is a perspective view illustrating a tool bar of an implement modified to include four different self-centering pivot assemblies.

FIG. 6 is a perspective view illustrating a tool bar of an agricultural implement modified to include four self-centering pivot assemblies. The agricultural implement shown provides for manure injection with manure injectors 70. The use of multiple self-centering pivot assemblies 10 allow for a toolbar with many rows to be used while still permitting closely following rows, even when contour farming or when irregularities in a field are present. Thus, the use of the self-centering pivot assembly can be highly advantageous. It is to be understood that although manure injectors or applicators are shown, the present invention contemplates that other types of working tools may be used.

Therefore, a self-centering pivot assembly for an agricultural implement has been described. It is to be understood that numerous variations are contemplated including in the number and placement of springs, the number of rows services by each self-centering pivot assemblies, the manner in which the assembly is attached to a toolbar and other options, variations, and alternatives.

What is claimed is:

1. A self-centering pivot assembly for an agricultural implement having a tool bar, the self-centering pivot assembly comprising:
   at least one spring;
   a bar segment operatively connected to one or more working tools of the agricultural implement;
   a mounting assembly having two parallel mounting plates operatively coupled to opposite sides of the bar segment and operatively connected to opposite sides of the tool bar of the agricultural implement;
   a pivot operatively connected to the bar segment and the at least one spring such that as the agricultural implements travels over the ground and the bar segment deviates laterally from a neutral position, the at least one spring temporarily compresses and urges the bar segment back towards the neutral position.

2. The self-centering pivot assembly of claim 1 wherein the pivot extends perpendicularly between the two parallel mourning plates.

3. The self-centering pivot assembly of claim 2 wherein the at least one spring includes a first spring extending rearwardly from the mounting assembly and beyond the bar segment and a second spring extending rearwardly from the mounting assembly and beyond the bar segment.

4. The self-centering pivot assembly of claim 3 further comprising a first bracket operatively connected between the mounting assembly and the first spring and a second bracket operatively connected between the mounting assembly and the second spring and a slot in each of the first bracket and the second bracket.

5. The self-centering pivot assembly of claim 3 further comprising a first spring receiver for receiving the first spring and a second spring receiver for receiving the second spring.

6. The self-centering pivot assembly of claim 1 wherein the one or more working tools include manure applicators.

7. The self-centering pivot assembly of claim 1 further comprising a stabilization bracket operatively connected around the pivot and to the mounting, assembly.

8. An agricultural implement comprising the self-centering pivot assembly of claim 1.

9. The self-centering pivot assembly of claim wherein the bar segment and the tool bar are parallel.

10. The self-centering pivot assembly of claim 1 further comprising an adjustable bracket operatively coupled to the mounting assembly, wherein the adjustable bracket has a slot configured to be movably coupled to a bolt member, and further wherein the adjustable bracket is configured to align the self-centering pivot assembly.

11. The self-centering pivot assembly of claim 5 further comprising coil guides associated with the first spring and the second spring, the coil guides having an opening along the length of the first spring and the second spring and configured to provide access to the first spring or the second spring.

12. The self-centering pivot assembly of claim 10 where the bolt member is connected to the one of the two parallel mounting plates.

13. The self-centering pivot assembly of claim 1 further comprising a mounting bracket directly connected to the bar segment and operatively coupled to the mounting assembly.

14. A self-centering pivot assembly for an agricultural implement, the self-centering pivot assembly comprising:
   a bar segment operatively connected to one or more working tools of the agricultural implement;
   a mounting assembly operatively connected to the bar segment, the mounting assembly comprising a first mounting plate above the bar segment, a second mounting plate below the bar segment, and a vertical center pivot member extending between the first mounting plate and the second mounting late;
   a first spring operatively connected to the mounting plate;
   a second spring operatively connected to the mounting plate;
   the first spring and the second spring extending rearwardly from the mounting assembly and beyond the bar segment;
   wherein the bar segment pivotally rotates relative to the mounting plate about the vertical center pivot member such that as the bar segment deviates laterally from a neutral position, the first spring and the second spring temporarily compress and urge the bar segment back towards the neutral position.

15. The self-centering pivot assembly of claim 14 further comprising a first bracket operatively connected between the mounting assembly and the first spring and a second bracket operatively connected between the mounting assembly and the second spring and a slot in each of the first bracket and the second bracket.

16. The self-centering pivot assembly of claim 15 further comprising a first spring receiver for receiving the first spring and a second spring receiver for receiving the second spring.

17. The self-centering pivot assembly of claim 16 wherein the one or more working tools include manure applicators.

18. The self-centering pivot assembly of claim 14 further comprising a stabilization bracket operatively connected around the pivot and to the mounting assembly.

19. An agricultural implement comprising the self-centering pivot assembly of claim 14.

20. The self-centering pivot assembly of claim 15 wherein the first bracket and the second bracket are disposed on opposite sides of the vertical center pivot member.

* * * * *